April 16, 1963  G. F. SPRAGENS  3,085,594
MULTI-WAY ROTARY VALVE STRUCTURE
Filed July 18, 1961  2 Sheets-Sheet 1
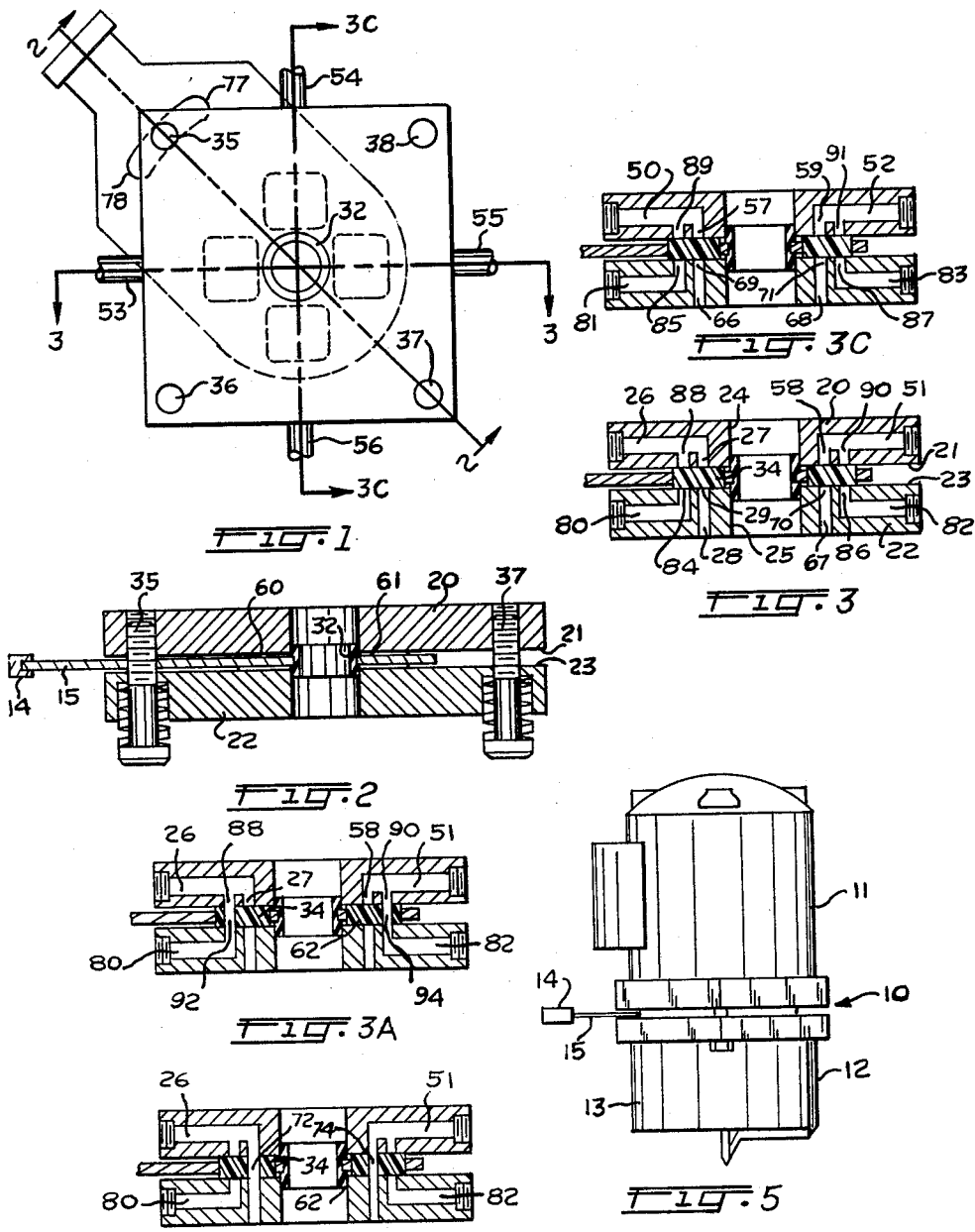
INVENTOR
GEORGE F. SPRAGENS
BY  W. E. Sherwood
ATTORNEY

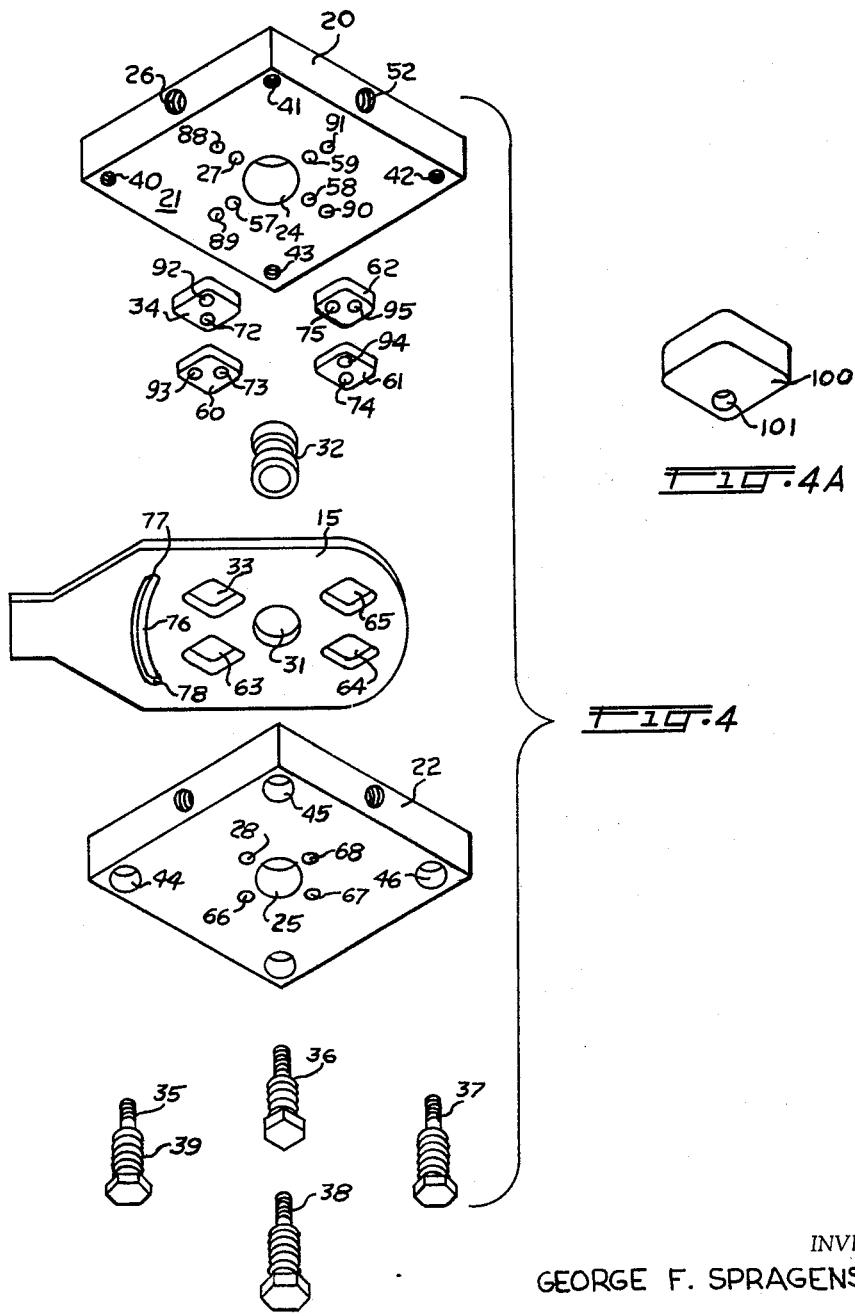

United States Patent Office 3,085,594
Patented Apr. 16, 1963

3,085,594
MULTI-WAY ROTARY VALVE STRUCTURE
George F. Spragens, 7608 La Grange Road, Lyndon, Ky.
Filed July 18, 1961, Ser. No. 126,834
7 Claims. (Cl. 137—625.18)

This invention relates to a valve structure and, more particularly, to such a structure employing a pivoted valve and being constructed for controlling more than one flow circuit at a time.

For purposes of disclosure the invention is described in connection with its usage in a process requiring unusual flexibility in the valve operation, namely, in the handling of foam producing ingredients. However, it is expressly to be understood that the invention is in no way to be limited to such a usage and, on the contrary, it is to be regarded as being of general utility.

As is known, the supply of the materials to the mixing stage of a plastic foam manufacturing process, especially the polyurethane and isocyanate types, presents flow control problems. These foams are produced by mixing two or more liquids, one of which will contain a polyether or polyester resin and the other of which contains a catalyst. The chemical reaction therebetween will begin as soon as these liquids are combined and consistent foam products can be produced only when the ingredients are present in exact proportions and are properly mixed. In my U.S. Patents Nos. 2,981,522 and 2,981,523, two types of mixers suitable for the mixing step are disclosed, but in order to employ such mixers efficiently, a valve structure in the supply lines to the mixer, and under instant control by the user of the mixer, and having a wide flexibility in use, is necessary.

For example, the flowable separate materials supplied to the mixer are under pressure and may be moved by a metering pump which runs continuously, or by a body of gas under pressure, or by an intermittently operable pump. For cleaning of the mixer equipment, a solvent may need to be supplied at a time when flow of other materials is cut off. For cleaning of the valve structure, such structure must be readily dismountable. For use with a portable mixing assembly, manually held by the operator, the valve structure must be light in weight and located at a convenient place for ready manipulation. Moreover, since a plurality of separate materials are being employed, the control for all materials must take place simultaneously. One of the purposes of the invention, therefore, is to provide a valve structure satisfying the above-mentioned and other requirements found in this particular art.

An object of the invention is to provide a valve structure which is simple and inexpensive in construction, and reliable in operation.

Another object is to provide a valve structure adapted for controlling flow of a plurality of separate materials simultaneously.

A further object is to provide a valve structure of the pivoted valve type having a movable apertured sealing pad controlling flow through the valve structure.

A further object is to provide a valve structure having a minimum of drippage of material on its discharge side.

Still a further object is to provide a valve structure having interchangeable and removable sealing pads.

These and other advantages and objects of the invention will become more apparent as the description proceeds and when considered in conjunction with the accompanying drawings in which:

FIG. 1 is a top plan view of the assembled valve structure prior to mounting in place on the equipment to be served;

FIG. 2 is a sectional view taken on line 2—2 of FIG. 1 and showing the valve member in its second position;

FIG. 3 is a sectional view taken on line 3—3 of FIG. 1;

FIG. 3A is a sectional view similar to FIG. 3 but showing the valve member in its first operative position;

FIG. 3B is a sectional view similar to FIG. 3 but showing the valve member in its third operative position;

FIG. 3C is a sectional view taken on line 3C—3C of FIG. 1;

FIG. 4 is a exploded view showing the components of the valve structure in perspective;

FIG. 4A is a perspective view of a sealing pad adapted for substitution for use in an optional on-off flow; and FIG. 5 is a view showing the valve structure assembled in operative position on a mixer, the conduits leading to the valve structure being omitted.

In accordance with the invention I provide a valve structure adapted for ready assembly and disassembly and having an inlet housing portion and an outlet housing portion with a valve member pivotally movable between those housing portions. Each housing portion contains one or more interior passages extending to corresponding ports located on a polished flat, inner surface of the housing portion. Mounted in the pivoted valve member for sliding movement across the polished surfaces are suitably resilient flat sealing pads held under compression adequate to prevent leakage into the space between the housing portions, but inadequate to develop a heavy frictional load to the movement of the valve member. Depending upon the flow control to be exerted, the corresponding sealing pad has the necessary aperture or apertures therethrough to communicate the ports with each other at the appropriate positioning of the valve member. Materials under pressure entering the valve structure are led thereto by suitable conduits attached to the respective passages in the inlet portion of the housing and material leaving the valve structure may pass into a suitable conduit attached to the passage in the outlet portion of the housing, or may pass directly from that passage to a point of use.

Referring first to FIG. 5, in one usage the valve structure designated generally at 10 may be rigidly attached at its top to a lower flange face of a motor housing 11. This motor is provided with an extended threaded shaft (not shown) projecting through the valve structure and upon the projecting end of such shaft the rotor member of the mixer, such as described in my afore-mentioned patents; is detachably held in threaded engagement with that shaft. A rigid bracket 12 attached at its upper end to an exposed face of the inlet housing portion of the valve structure supports a cover 13 shielding the rotor member. When it is desired to disassemble the valve structure, this may be done merely by detaching the bracket and removing the same with its attached cover, disengaging the rotor from the motor shaft, and then removing the valve structure from its attachment to the flanged face of the motor housing. The movement of the valve member in the valve structure now to be described may be effected by any suitable remote or automatic control, but, however, is normally effected by the user of the mixer assembly and for this purpose a handle 14 is attached to an end of the valve member 15 which projects laterally beyond the periphery of the inlet and outlet housing portions.

Considering now FIGS. 3 and 4, the several parts of the valve structure may conveniently comprise a generally square flat inlet housing portion 20 formed of stainless steel or other metallic or suitable material and having a highly polished surface on at least that portion of its lower face 21 on which the sealing pads are to slide. In addition, a generally square flat outlet housing portion 22 of similar material and having a similar highly polished surface on at least that portion of its upper face 23 in which those pads are to slide, is provided. Centrally located cylindrical apertures 24 and 25 extend through the respective housing members and when the valve structure is employed as described with respect to FIG. 5, will receive the shaft of the motor, and preferably without contact with that shaft. An inlet passage 26 extending through the inlet housing 20 and preferably from a side face thereof, is provided with a port 27 in the polished surface of the face 21. Also, a cooperating outlet passage 28 extending through the outlet housing 22 is provided with a port 29 in the polished surface of the face 23.

A flat valve member 15 of brass or other suitable material has a central circular hole 31 therethrough and into which a hollow plastic centering bushing 32 is adapted to be fitted. The hollow center of this bushing may receive the shaft of the above described motor and the periphery of the bushing fits closely against the cylindrical walls of the apertures 24 and 25 and serves to provide a fulcrum axis about which the valve member may conveniently be pivoted. Extending through the valve member is another aperture 33 of symmetrical proportions, here shown as generally square, and into which a sealing pad 34 is securely but removably housed. This pad has a thickness somewhat greater than the thickness of the valve member and is made of a material which is resistant to the materials being passed therethrough; has an appropriate resiliency; and has a low coefficient of friction against the polished surfaces of the faces 21 and 23. Teflon represents a suitable material for such a pad.

The thus-far described valve structure may be assembled in leak-proof relation by means of a plurality of threaded bolts seen at 35, 36, 37 and 38, each bolt having an enlarged head and including a cooperating heavy-duty compression spring 39 bearing against that head. Each bolt, moreover, has a threaded upper portion engageable with corresponding threaded holes 40, 41, 42 and 43 in the inlet housing portion when the valve structure is assembled apart from the motor housing. Suitable holes 44, 45, 46 and 47, each having an interior ledge against which the compression springs may bear, are formed in the outlet housing portion to receive the bolts. When the valve structure is to be assembled on the mixer as seen in FIG. 5, the threaded upper ends of the bolts pass completely through the holes of the inlet housing portion without threaded engagement therewith and engage in appropriate threaded holes in the flange face of the motor housing 11. Upon tightening of the bolts the sealing pad 34 is squeezed firmly between the housing portions in sealing relation to the ports but at the same time offers no substantial resistance to sliding movement along the polished surfaces on the faces of those housing portions. The sealing action is sufficient to withstand pressures in the order of 150 pounds per square inch upon the material being supplied to the inlet passage.

As a significant feature of the invention, the valve structure is adapted to control a plurality of different streams of materials and to direct the same to different, or to the same, destinations. For this purpose, the inlet housing portion may have, for example, four inlet passages 26, 50, 51 and 52 to which supply conduits 53, 54, 55 and 56 may be detachably connected as by female threads at the inlets to those passages. In such a usage, the respective passages terminate in ports 27, 57, 58 and 59, and the valve member 15 mounts sealing pads 34, 60, 61 and 62 in suitably positioned apertures 33, 63, 64 and 65, respectively. One advantage of this arrangement is that bearing surfaces are thus provided in a cluster about the pivot axis of the valve member and contribute to uniform tightening of the several bolts. The outlet housing portion contains cooperating short outlet passages 28, 66, 67 and 68 terminating in the respective ports 29, 69, 70 and 71.

With the foregoing in mind the inherent flexibility of use of the invention will now be apparent. When a simple on-off control for each of the plurality of flow circuits is desired, each of the sealing pads may contain a single aperture as seen at 72, 73, 74 and 75, respectively for cooperating with the valve ports and with an imperforate portion of the pad alongside that aperture. The valve member may conveniently be provided with an arcuate recess 76 movable in surrounding relation to one of the bolts which will form an abutment for the end wall of the recess when the valve member is moved completely to a first or flow position; which will be out of contact with the recess end walls when the member occupies an intermediate or second position of flow interruption (as seen in FIG. 1); and which will form an abutment for the end wall 78 of that recess when the valve member is moved to a third or alternate flow position, now to be described.

When materials are supplied to the valve structure by a metering pump, which, because of the nature of the material, requires continuous operation, a recirculation circuit for such material is needed during interruptions to normal dispensing flow through the structure. Such an alternate flow path is provided in the present invention by recirculating passages 80, 81, 82 and 83 in the outlet housing portion, these passages terminating in the respective ports 84, 85, 86 and 87. To these passages suitable recirculating, or other, conduits (not shown) are connected, it being understood that the term "recirculating" may connote merely a dispensing to a different receptacle than that offered by the first mentioned outlet passages. In employing this feature of the invention the inlet passages also terminate in supplementary ports seen at 88, 89, 90 and 91 and the corresponding sealing pads include a second aperture as seen at 92, 93, 94 and 95.

Having thus described the invention the operation of the same will now be apparent. With conduits connected and with the valve member in its second position as seen in FIG. 1 no flow takes place, but the compressed sealing pads meanwhile prevent any leakage into the space between the housing members. Upon moving that member fully clockwise, as seen in FIG. 1, in order to occupy the first or dispensing position, flow through the apertures 72, 73, 74 and 75 of the pads takes place, as seen in FIG. 3B, the flow passages to the recirculating outlet passage remaining closed, and with the pads still serving their sealing function. Upon finishing the dispensing the operator then promptly moves the valve member to bring the apertures 92, 93, 94, and 95 into correspondence with the appropriate ports at which time the valve member occupies its third or recirculating position, as seen in FIG. 3A, and with the pads still serving their sealing function. It will be noted that control is thus exerted simultaneously upon all of the plurality of flow circuits. Proper registry also is obtained in the first and third positions by holding the valve member in contact with the bolt 35.

Also in this embodiment of the invention any suitable means not shown, such as a detent may be used to position the valve member at its second position.

As a further embodiment, when materials are being handled which require only the recirculation flow and the dispensing flow in sequence, the sealing pads may include apertures of suitable configuration and with no imperforate portion of the pad being employed for cutting off the flow. In such a situation, the initiation and cessation of flow would, of course, be controlled by means external of the described valve structure.

Moreover, in special situations, it may be desirable to have one flow circuit in a multi-flow valve operative while the others are cut off, as when a solvent needs to be supplied to a mixer following the completion of a plastic foam forming operation. For this purpose the only modification required would be the substitution for one of the described sealing pads of another and differently formed pad in that solvent circuit. For example, a pad 100 having a single aperture 101 therethrough as seen in FIG. 4A may be employed to give the necessary flow circuit while the valve member occupies its third position and to interrupt that circuit while the valve member occupies its first position. Various advantages inherent in the invention will be obvious to those skilled in the art, as, for example, the dispensing of the several flow streams near a common center; the ability to incorporate into one structure a plurality of separate flow circuits which may readily include more than the four circuits shown for illustration; the use of the same structure for one or more flow circuits merely by substituting a different sealing pad; the compact nature of the structure and particularly the self-draining short dispensing outlet passage which has a small volumetric capacity and alleviates drippage after the flow is interrupted.

While a particular embodiment of my invention has been shown, it will be understood, of course, that I do not wish to be limited thereto since many modifications can be made; and I therefore, contemplate by the appended claims to cover any such modifications as fall within the true spirit and scope of the invention.

What is claimed is:

1. A valve structure adapted for optional recirculating and dispensing of flowable material and comprising, an inlet housing portion having a first flat surface and an inlet passage including a first recirculating port and a separate first dispensing port in said first surface, an outlet housing portion having a second flat surface in juxtaposed spaced relation to said first flat surface, said outlet housing portion having a recirculating passage including a second recirculating port in said second flat surface, said first and second recirculating ports lying on a common axis, and a separate dispensing passage including a second dispensing port in said second flat surface separate from said second recirculating port, said first and second dispensing ports lying on a common axis, a valve member mounted between said housing portions for pivotal movement across said ports and into first, second and third positions, said valve member having an opening therethrough extending about said dispensing and recirculating ports in all three positions of the valve member, a flat resilient sealing pad removably contained within said opening, said pad having a thickness greater than the thickness of said valve member, said pad having a recirculating aperture and a separate dispensing aperture therethrough, said recirculating aperture being so located in said pad as to establish communication between said first and second recirculating ports while said valve member occupies said third position and said dispensing aperture being so located in said pad as to establish communication between said first and second dispensing ports when said valve member occupies said first position, said pad having an imperforate portion closing communication between said inlet and outlet housing portions when said valve member occupies said second position, and means for holding said housing portions tightly against said pad at all positions of said valve member thereby to prevent leakage of material into the space between said housing portions.

2. A valve structure as defined in claim 1 wherein said dispensing passage extends between said second dispensing port and the face of said outlet housing portion opposite said second flat surface.

3. A valve structure as defined in claim 1 wherein said recirculating passage extends between said second recirculating port and the side periphery of said second housing portion.

4. A valve structure as defined in claim 1 wherein the respective apertures in said pad lie on radii of different length from the axis of pivotal movement of said valve member.

5. A valve structure as defined in claim 1 wherein said opening in said valve member is of non-circular configuration, said pad having a corresponding non-circular configuration assuring a predetermined registration of its apertures with said ports when confined within said non-circular aperture and with said valve member occupying a predetermined one of said positions.

6. A multi-port valve structure for simultaneously passing a plurality of flowable materials therethrough in separate streams and comprising an inlet housing portion having a first flat surface and a centrally located cylindrical aperture normal to said first flat surface, a plurality of separate inlet passages through said inlet housing for receiving said separate streams, each inlet passage terminating in a separate first port in said first flat surface, an outlet housing portion having a second flat surface in juxtaposed spaced relation to said first flat surface and a cylindrical aperture normal to said second flat surface, a plurality of separate outlet passages through said outlet housing for dispensing the respective materials and with each passage including a separate second port in said second surface, said second ports being equal in number to said first ports and with each of said corresponding first and second ports lying on a common axis, a flat valve member mounted between said housing portions for pivotal movement simultaneously across said ports between one position and another position, said valve member having a cylindrical aperture therethrough with the axis thereof corresponding to the axis of said apertures in said housing portions, a bushing fitted within the aperture in said housing portions and the aperture in said valve member and providing a support for pivotal movement of said member thereabout, a plurality of openings in said valve member corresponding in number to the pairs of said first and second ports, a flat resilient pad removably contained in each of said openings and having a thickness greater than the thickness of said valve member, each pad having an aperture therethrough for communicating its corresponding first and second ports with each other when said valve member occupies its said one position and for interrupting communication therebetween when said member occupies its said other position, and a plurality of spring loaded bolts joining said inlet and outlet housing members and disposed in circumferentialy spaced relation to said bushing, said bolts supporting heavy-duty compression springs serving to hold said first and second flat surfaces tightly against said pads when said structure is operatively assembled thereby to prevent leakage of said materials into the space between said housing portions.

7. A valve structure as defined in claim 6 wherein said pads are arrayed about said bushing with a substantially uniform spacing therefrom and from each other.

References Cited in the file of this patent

UNITED STATES PATENTS

| | | |
|---|---|---|
| 2,100,366 | Tyler | Nov. 30, 1937 |
| 2,791,245 | Alcott | May 7, 1957 |
| 2,959,330 | Charbonneau | Nov. 8, 1960 |